(12) United States Patent
Kitchaev et al.

(10) Patent No.: US 12,482,837 B2
(45) Date of Patent: Nov. 25, 2025

(54) ELECTROCHEMICAL CELL CATALYST STATE OF HEALTH MONITORING DEVICE

(71) Applicant: Robert Bosch GmbH, Stuttgart (DE)

(72) Inventors: Daniil A Kitchaev, Brookline, MA (US); Mordechai Kornbluth, Brighton, MA (US); Lei Cheng, San Jose, CA (US); Kuppan Saravanan, San Jose, CA (US); Jonathan Braaten, Sunnyvale, CA (US); Nathan Craig, Santa Clara, CA (US); Charles Tuffile, Swansea, MA (US)

(73) Assignee: Robert Bosch GmbH, Stuttgart (DE)

( * ) Notice: Subject to any disclaimer, the term of this patent is extended or adjusted under 35 U.S.C. 154(b) by 772 days.

(21) Appl. No.: 17/836,755

(22) Filed: Jun. 9, 2022

(65) Prior Publication Data
US 2023/0402631 A1    Dec. 14, 2023

(51) Int. Cl.
*H01M 8/04313* (2016.01)
*G01R 31/392* (2019.01)

(52) U.S. Cl.
CPC ...... *H01M 8/04313* (2013.01); *G01R 31/392* (2019.01)

(58) Field of Classification Search
None
See application file for complete search history.

(56) References Cited

U.S. PATENT DOCUMENTS

2024/0297317 A1\* 9/2024 Mao ................ H01M 8/04664

OTHER PUBLICATIONS

Chernavskii, P. A. et al., "Magnetometric methods of investigation of supported catalysts," Russian Chemical Reviews, vol. 80, No. 6, 2011, pp. 579-604.
Cook, R. M., "The development of magnetic granulometry for application to heterogeneous catalysts," Doctoral Dissertation, University of Warwick, May 2014, 184 pages, http://wrap.warwick.ac.uk/63943/1/WRAP_THESIS_Cook_2014.pdf.
Constant, F. W., "The magnetic properties of certain Pt—Co and Pd—Co alloys," Physical Review, vol. 36, No. 11, Dec. 1, 1930, pp. 1654-1660.
Estournes, C. et al., "Nickel nanoparticles in silica gel: preparation and magnetic properties," Journal of Magnetism and Magnetic Materials, vol. 173, 1997, pp. 83-92.
(Continued)

*Primary Examiner* — Jas A Sanghera
(74) *Attorney, Agent, or Firm* — Brooks Kushman P.C.

(57) ABSTRACT

An electrochemical cell catalyst state of health monitoring device. The device includes a first magnetic device adjacent a first side of a first catalyst material associated with a first electrode. The device further includes a second magnetic device adjacent a second side of the first catalyst material. The first or second magnetic device is configured to generate a magnetic field. The other of the first and second magnetic devices is configured to receive a magnetic response from the first catalyst material. The device also includes a controller configured to receive the magnetic response and to determine magnetic response data of the first catalyst material in response to the magnetic response. The magnetic response data is indicative of a state of health.

21 Claims, 1 Drawing Sheet

(56) References Cited

OTHER PUBLICATIONS

Karmaoui, M. et al., "Smallest Bimetallic CoPt3 Superparamagnetic Nanoparticles," The Journal of Physical Chemistry Letters, vol. 7, No. 20, Sep. 27, 2016, pp. 4039-4046, DOI: 10.1021/acs.jpclett.6b01768.

Masala, O. et al., "Preparation of magnetic spinel ferrite core/shell nanoparticles: Soft ferrites on hard ferrites and vice versa," Solid State Sciences, vol. 8, No. 9, 2006, pp. 1015-1022, DOI:10.1016/j.solidstatesciences.2006.04.014.

Sanchez, J. M. et al., "Magnetic properties and chemical ordering in Co—Pt," Journal of Physics: Condensed Matter, vol. 1, No. 2, 1989, pp. 491-496.

* cited by examiner

ELECTROCHEMICAL CELL CATALYST STATE OF HEALTH MONITORING DEVICE

TECHNICAL FIELD

The present disclosure relates to an electrochemical cell catalyst state of health monitoring device. The electrochemical cell catalyst state of health monitoring device may be configured to measure catalyst state of health contemporaneously with operation of an electrochemical cell (e.g., a fuel cell or an electrolyzer).

BACKGROUND

An electrochemical cell is a device capable of either generating electrical energy from chemical reactions (e.g., fuel cells) or using electrical energy to conduct chemical reactions (e.g., electrolyzers). Fuel cells have shown promise as an alternative power source for vehicles and other transportation applications. Fuel cells operate with a renewable energy carrier, such as hydrogen. Fuel cells also operate without toxic emissions or greenhouse gases. An individual fuel cell includes a membrane electrode assembly (MEA) and two flow field plates. An individual fuel cell typically delivers 0.5 to 1.0 V. Individual fuel cells can be stacked together to form a fuel cell stack having higher voltage and power.

Electrolyzers undergo an electrolysis process to split water into hydrogen and oxygen, providing a promising method for hydrogen generation from renewable resources. An electrolyzer, like a fuel cell, includes an anode and cathode catalyst layers separated by an electrolyte membrane. The electrolyte membrane may be a polymer, an alkaline solution, or a solid ceramic material. A catalyst material is included in the anode and cathode catalyst layers of the electrolyzer.

One of the current limitations of widespread adoption and use of this clean and sustainable technology is the relatively expensive cost of the fuel cell. A catalyst material (e.g., platinum catalyst) is included in both the anode and cathode catalyst layers of an electrochemical cell. The catalyst material is one of the most expensive components in the electrochemical cell.

SUMMARY

According to one embodiment, an electrochemical cell catalyst state of health monitoring device is disclosed. The device includes a first magnetic device adjacent a first side of a first catalyst material associated with a first electrode. The device further includes a second magnetic device adjacent a second side of the first catalyst material. The first or second magnetic device is configured to generate a magnetic field. The other of the first and second magnetic devices is configured to receive a magnetic response from the first catalyst material. The device also includes a controller configured to receive the magnetic response and to determine magnetic response data of the first catalyst material in response to the magnetic response. The magnetic response data is indicative of a state of health of the first catalyst material.

According to another embodiment, an electrochemical cell for monitoring catalyst state of health is disclosed. The electrochemical cell includes first and second electrodes including first and second catalyst materials, respectively. The electrochemical cell also includes a polymer electrolyte material extending between the first and second electrodes. The electrochemical cell also includes a first magnetic device adjacent a first side of a first catalyst material. The electrochemical cell also includes a second magnetic device adjacent a second side of the first catalyst material. The first or second magnetic device is configured to generate a magnetic field. The other of the first and second magnetic devices is configured to receive a magnetic response from the first catalyst material. The magnetic response signals are indicative of magnetic response data of the first catalyst material indicative of a state of health of the first catalyst material.

According to yet another embodiment, a method of monitoring a state of health of an electrochemical cell is disclosed. The method includes operating an electrochemical cell having first and second electrodes including first and second catalyst materials, respectively, and a polymer electrolyte material extending between the first and second electrodes. The method further includes generating, via a first magnetic device, a magnetic field during the operating step. The method also includes receiving, via a second magnetic device, a magnetic response from the first catalyst material during the operating step. The method also includes determining magnetic response data of the first catalyst material in response to the magnetic response. The magnetic response data indicative of the state of health of the first catalyst material.

DETAILED DESCRIPTION

Figure 1:
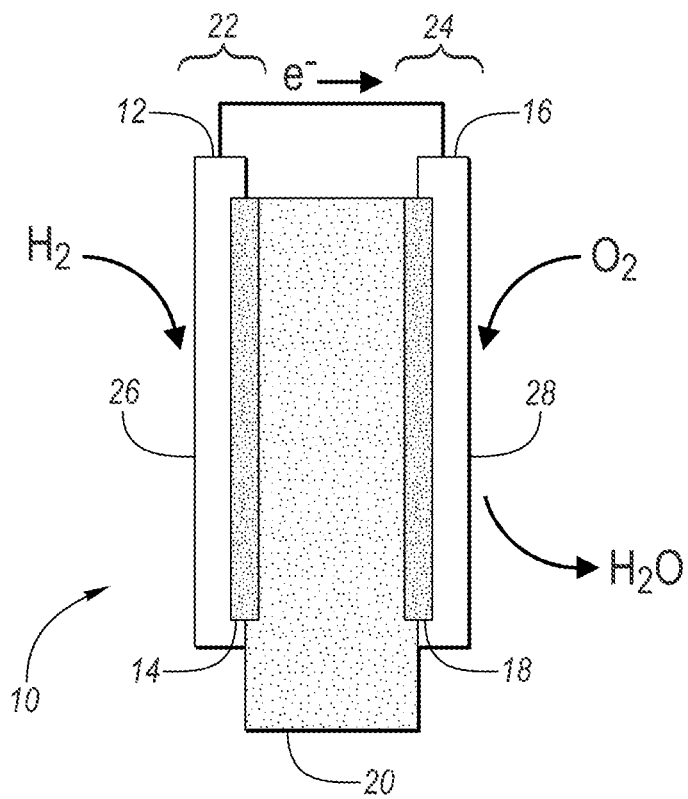
FIG. 1 depicts a schematic, side view of certain components of a proton-exchange membrane fuel cell.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This invention is not limited to the specific embodiments and methods described below, as specific components and/or conditions may, of course, vary. Furthermore, the terminology used herein is used only for the purpose of describing embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

Due to rising carbon dioxide emissions and the relatively high current dependency on non-renewable fossil fuels as energy carriers in the transportation sector, there is an ever increasing need to develop and commercialize transportation technologies that use clean and sustainable sources of energy. One technology that possesses promise is a fuel cell. A fuel cell uses oxygen from air and compressed hydrogen as fuel sources, while only emitting water and heat. The widespread adoption of fuel cells would reduce carbon dioxide emissions. However, widespread adoption requires further technological development. One area for further technological development is improvement of the durability of the catalyst materials in the fuel cell by monitoring the state of health of the catalysts.

FIG. 1 depicts a schematic, side view of certain components of proton-exchange membrane fuel cell (PEMFC or otherwise referred to as a fuel cell) 10 according to one embodiment. As shown in FIG. 1, fuel cell 10 includes anode catalyst support 12 coated with anode catalyst layer 14 formed of an anode catalyst material and cathode catalyst support 16 coated with cathode catalyst layer 18 formed of a cathode catalyst material. Polymer electrolyte material (PEM) 20 extends between anode catalyst support 12 and cathode catalyst support 16. The cathode catalyst material may be dispersed at an interface of PEM 20 and a current collector (not shown) supported by a cathode catalyst support. The current collector may be a porous carbon current collector. Anode catalyst layer 14 is positioned between anode catalyst support 12 and PEM 20. Cathode catalyst layer 18 is positioned between cathode catalyst support 16 and PEM 20. Anode 22 may generally refer to anode catalyst support 12 and anode catalyst layer 14. Cathode 24 may generally refer to cathode catalyst support 16, cathode catalyst layer 18, and the current collector.

Fuel cell 10 also includes first and second gas diffusion layers (GDLs) (not shown). First GDL is adjacent outer surface 26 of anode 12 and second GDL is adjacent outer surface 28 of cathode 16.

Anode 22 is configured to perform a hydrogen oxidation reaction (reproduced as equation 1 below), while cathode 24 is configured to perform an oxygen reduction reaction (reproduced as equation 2 below) during operation of fuel cell 10.

$$H_2 \rightarrow 2H^+ + 2e^- \quad (1)$$

$$4H^+ + O_2 + 4e^- \rightarrow 2H_2O \quad (2)$$

Due to the complexity of transferring four (4) electrons, the oxygen reduction reaction is rate limiting and poses a significant challenge to the optimization of a catalyst material. The degradation of the cathode catalyst material in cathode catalyst layer 18 may be a significant source of overall performance loss over time in fuel cell 10.

During fuel cell operation, the cathode catalyst material may degrade primarily via (1) coarsening in which the average particle size increases, and/or (2) dealloying in which the M element is lost by dissolution in PEM 20. The coarsening and dealloying rates may be sensitive to global operating parameters (e.g., applied voltage and/or temperature) of fuel cell 10 and/or local environment parameters around each catalyst nanoparticle (e.g., hydration level and/or the structure of the carbon support).

Catalyst degradation may be measured by a combination of indirect metrics (e.g., overall fuel cell polarization) and direct, post-disassembly characterization of the fuel cell (e.g., following an accelerated aging protocol). While post-disassembly characterization (e.g., via electron microscopy and/or spectroscopy) may be very accurate, post-disassembly characterization does not provide a contemporaneous measurement of catalyst state of health during fuel cell operation. Moreover, post-disassembly characterization may be limited in throughput and the number of fuel cells that can be examined and characterized. Conversely, electrochemical polarization data may convolve catalyst degradation with numerous other sources of polarization in the fuel cell. Therefore, electrochemical polarization data may not be used to reliably measure catalyst state of health contemporaneously during fuel cell operation. In light of the foregoing, what is needed is an electrochemical cell catalyst state of health monitoring device configured to measure catalyst state of health contemporaneously with operation of an electrochemical cell.

In one or more embodiments, the electrochemical cell catalyst state of health monitoring device may be a fuel cell catalyst state of health monitoring device. The fuel cell catalyst state of health monitoring device may utilize a magnetic response of the catalyst material (e.g., $Pt_{1-x}M_x$ alloy nanoparticles where $0 \leq x \leq 1$ and M is Co, Ni, Fe, a rare earth metal, or any other magnetic or paramagnetic element). The diameter of the average particle size of the alloy nanoparticles may be any of the following values or in a range of any two of the following values: 1.0, 2.0, 3.0, 4.0, 5.0, 6.0, 7.0, 8.0, 9.0, 10, 12, 14, 16, 18, 20, 22, 24, 26, 28, and 30 nm. The magnetic response of the catalyst material may be probed during operation of the fuel cell.

Figure 2:
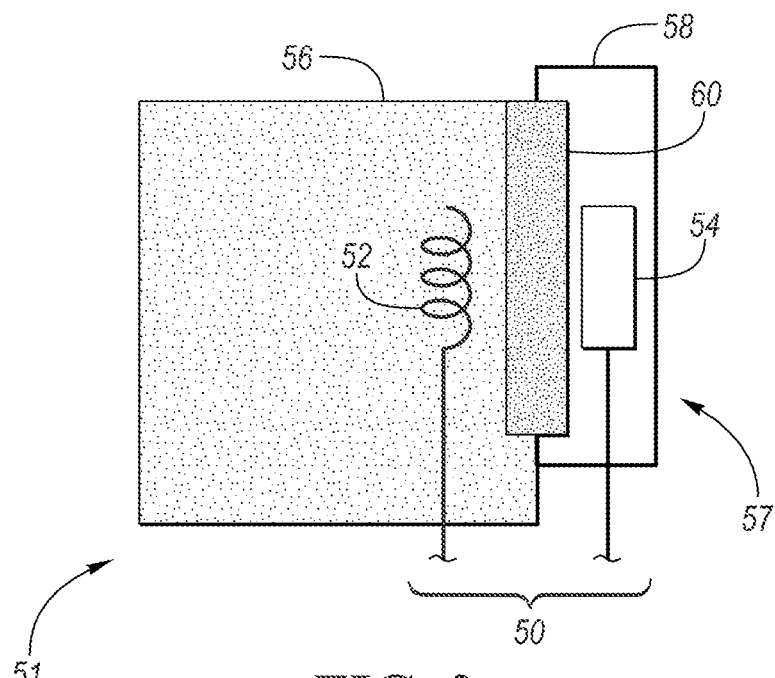
FIG. 2 depicts a schematic, side view of certain components of a fuel cell catalyst state of health monitoring device.

FIG. 2 depicts a schematic, side view of certain components of a fuel cell catalyst state of health monitoring device 50 integrated into fuel cell 51. Fuel cell 51 includes cathode 57. As shown in FIG. 2, cathode 57 includes cathode catalyst support 58 coated with cathode catalyst layer 60 formed of a cathode catalyst material (e.g., catalyst nanoparticles).

Fuel cell 51 also includes an anode (not shown). Polymer electrolyte material (PEM) 56 extends between cathode 57 and the anode (not shown).

The fuel cell catalyst state of health monitoring device 50 may include first and second magnetic devices. The first and second magnetic devices may be used to generate and/or measure a magnetic field. The first or second magnetic device is configured to generate a magnetic field. The other of the first and second magnetic devices is configured to receive a magnetic response from the first catalyst material. As shown in FIG. 2, the first and second magnetic devices are electromagnet 52 and magnetometer 54. Electromagnet 52 is at least partially embedded or fully embedded in PEM 56. Magnetometer 54 is at least partially embedded or fully embedded in cathode 57 (e.g., cathode catalyst support 58). In one or more embodiments, the first and second magnetic devices may be adjacent first and second opposing sides of the catalyst material. For example, the first and second magnetic devices may be placed above and below the electrochemical cell.

The longitudinal axes of electromagnet 52 and magnetometer 54 may be substantially or entirely aligned with each other. Electromagnet 52 may be adjacent to and spaced apart from cathode catalyst layer 60. Magnetometer 54 (e.g., a micro-electromechanical system (MEMS) device) may be adjacent to and spaced apart from cathode catalyst layer 60. Electromagnet 52 may be spaced apart from the closest surface of cathode catalyst layer 60 thereto a distance that is longer than the distance magnetometer 54 is spaced apart from the closest surface of cathode catalyst layer thereto. Magnetometer 54 may be spaced apart from the closest surface of cathode catalyst later by any of the following distances or in a range of any two of the following distances: 1, mm 2 mm, 3 mm, 4 mm, 5 mm, 6 mm, 7 mm, 8 mm, 9 mm, 10 mm, 1 cm, 2 cm, 3 cm, 4 cm, and 5 cm. In another embodiment, the first and second magnetic devices are spaced apart from their respective catalyst surface layers an equal distance. The first and second magnetic devices may be aligned along a width direction of fuel cell 51 (e.g., the width direction may be extending into and out of the FIG. 2). Electromagnet 52 and magnetometer 54 may be connected to a controller (not shown) configured to receive and interpret the signals received from electromagnet 52 and/or magnetometer 54.

The cathode catalyst material of cathode catalyst layer 60 provides a magnetic response during operation of the fuel cell. Electromagnet 52 and magnetometer 54 in connection with the control is configured to probe the magnetic response of the cathode catalyst materials.

In one or more embodiments, the fuel cell including the first and second magnetic devices does not include any magnetic components other than the cathode catalyst material (e.g., $Pt_{1-x}M_x$ catalyst nanoparticles) to avoid magnetic contamination. For example, the fuel cell may not include any magnetic steel components (e.g., stainless-steel components). In one or more embodiments, the measurement of the catalyst magnetic response is performed at a frequency tuned to isolate the catalyst magnetic signal from any eddy currents induced in the electrode (e.g., catalyst material), either by tuning the frequency of the magnetic field or by finding the resonant frequency specific to the catalyst nanoparticles.

One or more embodiments may be used on catalyst compositions of $Pt_{1-x}M_x$ (M=Co, Ni, Fe), which are ferromagnetic as bulk alloys. These catalyst compositions may exhibit superparamagnetic properties as nanoparticles. These catalyst compositions may exhibit relatively large magnetic moments while maintaining a collective magnetization in the absence of an applied field. The magnetic moment of each nanoparticle is a function of temperature and composition and increases smoothly with x (the concentration of the magnetic element M). The relaxation time of the magnetization may be defined as a characteristic time for a magnetization to decay after the magnetic field is switched off. The relaxation time may be given by $\tau \propto \exp[KV/k_BT]$ where K is a magnetic anisotropy constant, V is the particle volume, T is the temperature, and $k_BT$ is thermal energy. In a limit of very small nanoparticles and high temperatures where $KV \ll k_BT$, the relaxation time becomes too small to be detectable. Under these circumstances, the catalyst particle material volume may be related to a non-hysteretic sample magnetization as a function of the applied field as set forth in equation (1) below:

$$M = M_s V_0 \int_0^\infty \left( cth \frac{M_s V H}{k_B T} - \frac{k_B T}{M_s V H} \right) f(V) dV \quad (1)$$

where M is a magnetization, $M_s$ is a saturation magnetization, $V_0$ is a total cathode volume, f(V) is a distribution of nanoparticle volumes in a sample, and H is a applied magnetic field. The relationship set forth in equation (1) may be solved numerically to obtain a particle size distribution and a saturation magnetization. The numerical inversion may also be aided by assuming a model distribution for f(V), allowing the problem may be solved by Bayesian Inference or related methods.

The evolution of the catalyst particle size and composition over time may be determined from the magnetometry data collected from the first and/or second magnetic devices. In one or more embodiments, the evolution may be used to provide a direct measure of a catalyst state of health. In one or more embodiments, the state of health device used the magnetometry data to adjust one or more operating parameters of the fuel cell to reduce or minimize future degradation, provide load balance within a larger fuel stack, guide the PEMFC maintenance procedures and/or help optimize the structure of the catalyst and/or electrode assembly in future fuel cells.

In one or more embodiments, the state of health measurement device may include a power source for electromagnet 52 shown in FIG. 2. The power source may be battery-operated or is powered by the fuel cell itself (e.g., via the voltage generated by the fuel cell reactions (1) and (2) shown above).

In one or more embodiments, the magnetometer may have a working principle of a mechanical motion caused by the interaction of an internal current with an external magnetic field. The sensing principle by which the motion is detected may be one that measures capacitance or voltage, vibrational resonance frequencies, or an optical sensor such as a laser. A MEMS magnetometer may detect magnetic fields of 0.3 µT (e.g., the Bosch BMM150 Sensortech sensor available from Robert Bosch GmbH), which is sufficient for detecting $Pt_{1-x}M_x$ nanoparticles at typical concentrations found in PEMFC catalysts at distances up to 5 mm from the magnetometer.

In one or more embodiments, the sensing device may have a cutoff where alloy concentrations of greater than 50, 75, or 90% Pt are not detectable at room temperatures due to the loss of magnetic coupling between the magnetic atoms. The cutoff may be specific to the magnetic alloy $Pt_{1-x}M_x$ The sensing data may be used to identify degraded stacks or portions thereof that are candidates for replacement. A controller or control unit may vary the voltages, temperatures, or other operating parameters of the remainder of the device to compensate (e.g., increased voltage) or prevent further damage (e.g., decreased voltage).

In one or more embodiments, the magnetometry data may be aggregated from multiple fuel cell systems (e.g., from multiple fleet vehicles). The aggregated data may be used to create an improved degradation model.

The processes, methods, or algorithms disclosed herein can be deliverable to and/or implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An electrochemical cell catalyst state of health monitoring device comprising:
 a first magnetic device adjacent a first side of a first catalyst material associated with a first electrode;
 a second magnetic device adjacent a second side of the first catalyst material, the first or second magnetic device configured to generate a magnetic field, the other of the first and second magnetic devices configured to receive a magnetic response from the first catalyst material in response to the magnetic field; and
 a controller configured to receive the magnetic response and to determine magnetic response data of the first catalyst material in response to the magnetic response, the magnetic response data indicative of a state of health of the first catalyst material.

2. The electrochemical cell catalyst state of health monitoring device of claim 1, wherein the magnetic response data includes a particle size distribution and/or a saturation magnetization of the first catalyst material at first and second times, the controller is configured to measure the state of health of the first catalyst material in response to the particle size distribution and/or the saturation magnetization at the first and second times.

3. The electrochemical cell catalyst state of health monitoring device of claim 2, wherein the controller is configured to determine the particle size distribution and/or the saturation magnetization of the first catalyst material using the following equation:

$$M = M_s V_0 \int_0^\infty \left( cth\frac{M_s VH}{k_B T} - \frac{k_B T}{M_s VH} \right) f(V) dV$$

where M is a magnetization, $M_s$ is a saturation magnetization, $V_0$ is a total cathode volume, V is a particle volume, T is a temperature, f(V) is a distribution of particle volumes in a sample, and H is an applied magnetic field.

4. The electrochemical cell catalyst state of health monitoring device of claim 1, wherein the first magnetic device is an electromagnet, and the second magnetic device is a magnetometer.

5. The electrochemical cell catalyst state of health monitoring device of claim 1, wherein first catalyst material includes $Pt_{1-x}M_x$ nanoparticles, where $0 \leq x \leq 1$ and M is Co, Ni, Fe, a rare earth metal, or a combination thereof.

6. The electrochemical cell catalyst state of health monitoring device of claim 1, wherein the first or second magnetic devices is configured to receive the magnetic response at an isolation frequency isolating the magnetic response from eddy currents induced within the first catalyst material.

7. An electrochemical cell for monitoring catalyst state of health, the electrochemical cell comprising:
 first and second electrodes including first and second catalyst materials, respectively;
 a polymer electrolyte material extending between the first and second electrodes;
 a first magnetic device adjacent a first side of the first catalyst material; and
 a second magnetic device adjacent a second side of the first catalyst material, the first or second magnetic device configured to generate a magnetic field, the other of the first and second magnetic devices configured to receive a magnetic response from the first catalyst material in response to the magnetic field, the magnetic response indicative of magnetic response data of the first catalyst material indicative of a state of health of the first catalyst material.

8. The electrochemical cell of claim 7, further comprising a controller configured to receive the magnetic response and to determine the magnetic response data of the first catalyst material in response to the magnetic response.

9. The electrochemical cell of claim 8, wherein the magnetic response data includes a particle size distribution and/or a saturation magnetization of the first catalyst material at first and second times, the controller is configured to measure the state of health of the first catalyst material in response to the particle size distribution and/or the saturation magnetization at the first and second times.

10. The electrochemical cell of claim 9, wherein the controller is configured to determine the particle size distribution and/or the saturation magnetization of the first catalyst material using the following equation:

$$M = M_s V_0 \int_0^\infty \left( cth \frac{M_s VH}{k_B T} - \frac{k_B T}{M_s VH} \right) f(V) dV$$

where M is a magnetization, $M_s$ is a saturation magnetization, $V_0$ is a total cathode volume, V is a particle volume, T is a temperature, f(V) is a distribution of particle volumes in a sample, and H is an applied magnetic field.

11. The electrochemical cell of claim 7, wherein the first or second magnetic devices is configured to receive the magnetic response signals at an isolation frequency isolating the magnetic response from eddy currents induced within the first catalyst material.

12. The electrochemical cell of claim 7, wherein the first magnetic device is an electromagnet, and the second magnetic device is a magnetometer.

13. The electrochemical cell of claim 12, wherein the magnetometer is spaced apart from the first catalyst material up to 5 cm.

14. The electrochemical cell of claim 12, wherein the electromagnet is powered by an electrochemical device.

15. The electrochemical cell of claim 7, wherein the first catalyst material includes $Pt_{1-x}M_x$ nanoparticles, where $0 \leq x \leq 1$ and M is Co, Ni, Fe, a rare earth metal, or a combination thereof.

16. A method of monitoring a state of health of an electrochemical cell, the method comprising:

operating an electrochemical cell having first and second electrodes including first and second catalyst materials, respectively, and a polymer electrolyte material extending between the first and second electrodes;

generating, via a first magnetic device, a magnetic field during the operating step;

receiving, via a second magnetic device, a magnetic response from the first catalyst material in response to the magnetic field during the operating step; and determining magnetic response data of the first catalyst material in response to the magnetic response, the magnetic response data indicative of the state of health of the first catalyst material.

17. The method of claim 16, wherein the first magnetic device is an electromagnet and the second magnetic device is a magnetometer.

18. The method of claim 17, further comprising powering the electromagnet with an electrochemical device.

19. The method of claim 16, wherein the first catalyst material includes $Pt_{1-x}M_x$ nanoparticles, where $0 \leq x \leq 1$ and M is Co, Ni, Fe, a rare earth metal, or a combination thereof.

20. The method of claim 16, wherein the magnetic response data includes a particle size distribution and/or a saturation magnetization of the first catalyst material at first and second times.

21. The method of claim 16, further comprising controlling one or more operating parameters of the electrochemical cell in response to the magnetic response data.

* * * * *